Aug. 23, 1955 K. J. MAGNUSSON 2,716,153

FACSIMILE SCANNER

Filed May 26, 1950 5 Sheets-Sheet 1

INVENTOR
KNUT J. MAGNUSSON
BY George T. Craig
ATTORNEY

Aug. 23, 1955 K. J. MAGNUSSON 2,716,153

FACSIMILE SCANNER

Filed May 26, 1950 5 Sheets-Sheet 2

INVENTOR
KNUT J. MAGNUSSON
BY
George J. Craig
ATTORNEY

Aug. 23, 1955 K. J. MAGNUSSON 2,716,153

FACSIMILE SCANNER

Filed May 26, 1950 5 Sheets-Sheet 3

INVENTOR
KNUT J. MAGNUSSON
BY
George T. Craig
ATTORNEY

Aug. 23, 1955 K. J. MAGNUSSON 2,716,153

FACSIMILE SCANNER

Filed May 26, 1950 5 Sheets-Sheet 4

INVENTOR
KNUT J. MAGNUSSON
BY George T. Craig
ATTORNEY

Aug. 23, 1955 K. J. MAGNUSSON 2,716,153

FACSIMILE SCANNER

Filed May 26, 1950 5 Sheets-Sheet 5

INVENTOR
KNUT J. MAGNUSSON
BY
George T. Craig
ATTORNEY

United States Patent Office 2,716,153

Patented Aug. 23, 1955

2,716,153

FACSIMILE SCANNER

Knut J. Magnusson, Princeton, N. J., assignor, by mesne assignments, to the United States of America as represented by the Secretary of the Army Application May 26, 1950, Serial No. 164,589

7 Claims. (Cl. 178—7.1)

The present invention relates to a facsimile scanner of the type having a rotary drum for holding subject copy and more particularly, but not necessarily exclusively, to a facsimile scanner having a drum embodying special loading and unloading features to accommodate large size sheets of subject copy.

In accordance with the invention a facsimile scanner is provided having a rotating copy holder drum surrounded by a flexible two-part curtain. During scanning this curtain is securely held against the periphery of the drum and is releasable to provide for loading. The two-part curtain has an outer transparent flexible layer to provide for optical scanning by a traveling optical system externally of the drum. Means are provided for indicating the position of the traveling optical scanning system. A cover for the entire scanner serves, in the novel manner, as a loading desk.

The principal object of the invention is to provide a scanner having a novel loading and unloading means for accommodating subject copy.

Another object is to provide a novel rotary drum for a facsimile scanner having a releasing and locking device for a flexible subject copy holding curtain.

A further object is to provide a novel housing for a facsimile scanner having a cover to serve as a loading desk when subject copy is being inserted in or removed from the scanner.

Other objects will be seen by reading this specification which refers to the drawings in which.

Figures 1, 5:
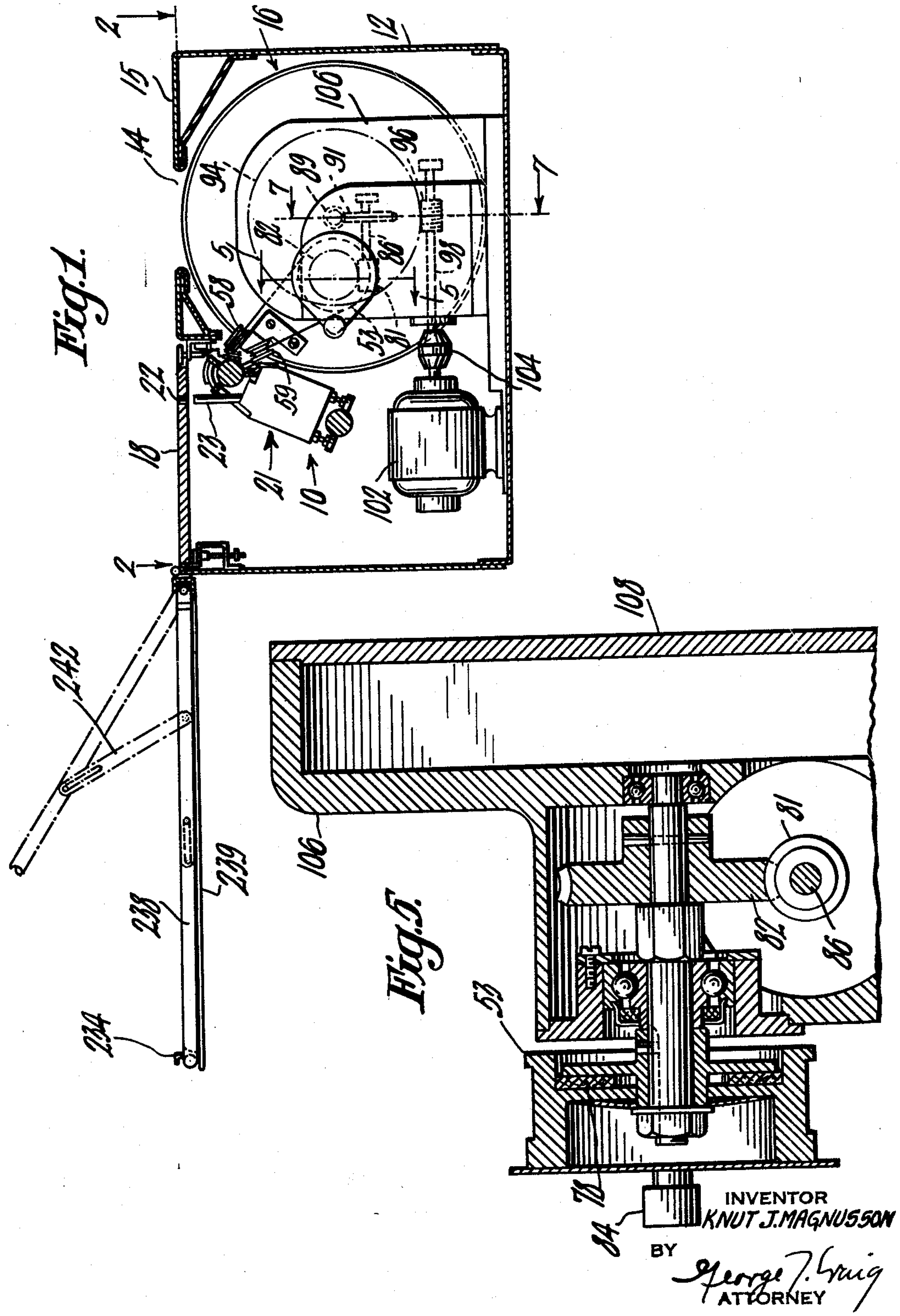
Figure 1 is a view in sectional elevation of a scanner embodying this invention, the section being taken on line 1—1 of Fig. 2.
Fig. 5 is a sectional view to an enlarged scale showing the driving mechanism for the optical system, the section being taken on line 5—5 of Fig. 1.
Figure 6:
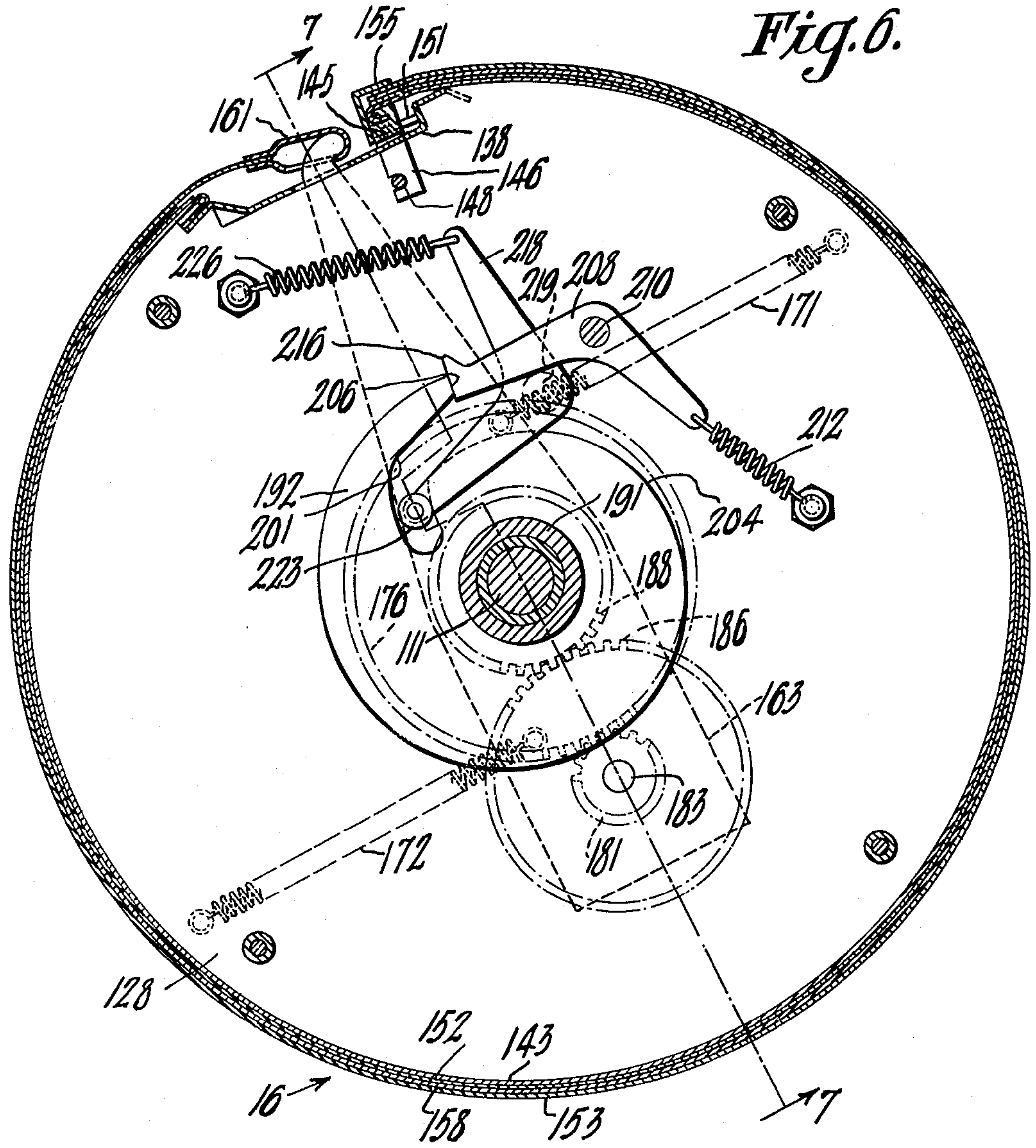
Figure 7:
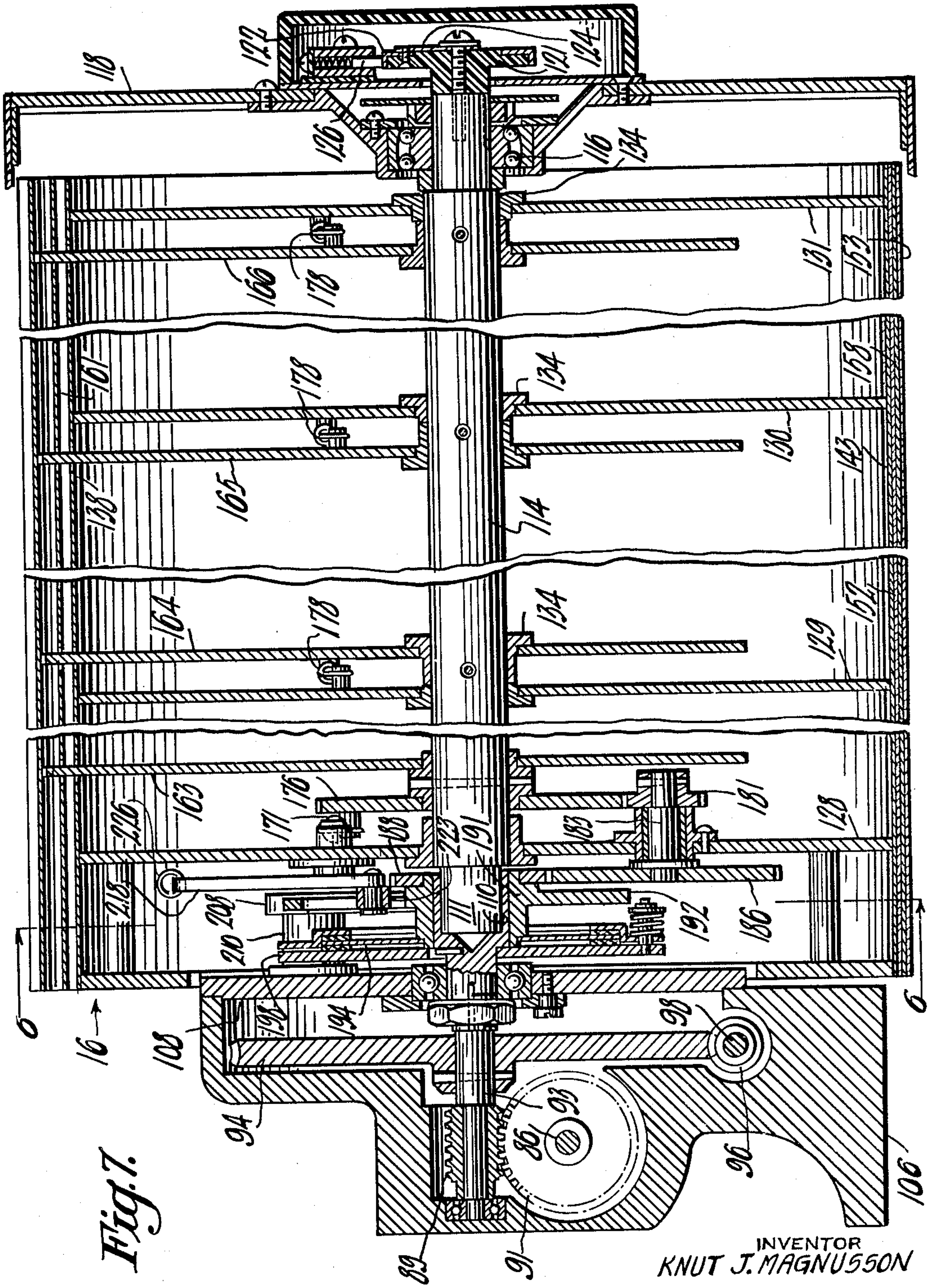

Fig. 6 is a view in section of the copy holding drum, the section being taken on line 6—6 of Fig 7; and Fig. 7 is a vertical sectional view through the drum and drum drive mechanism, the section being taken on line 7—7 of Fig. 1 and, also, on line 7—7 of Fig. 6.

Figure 2:
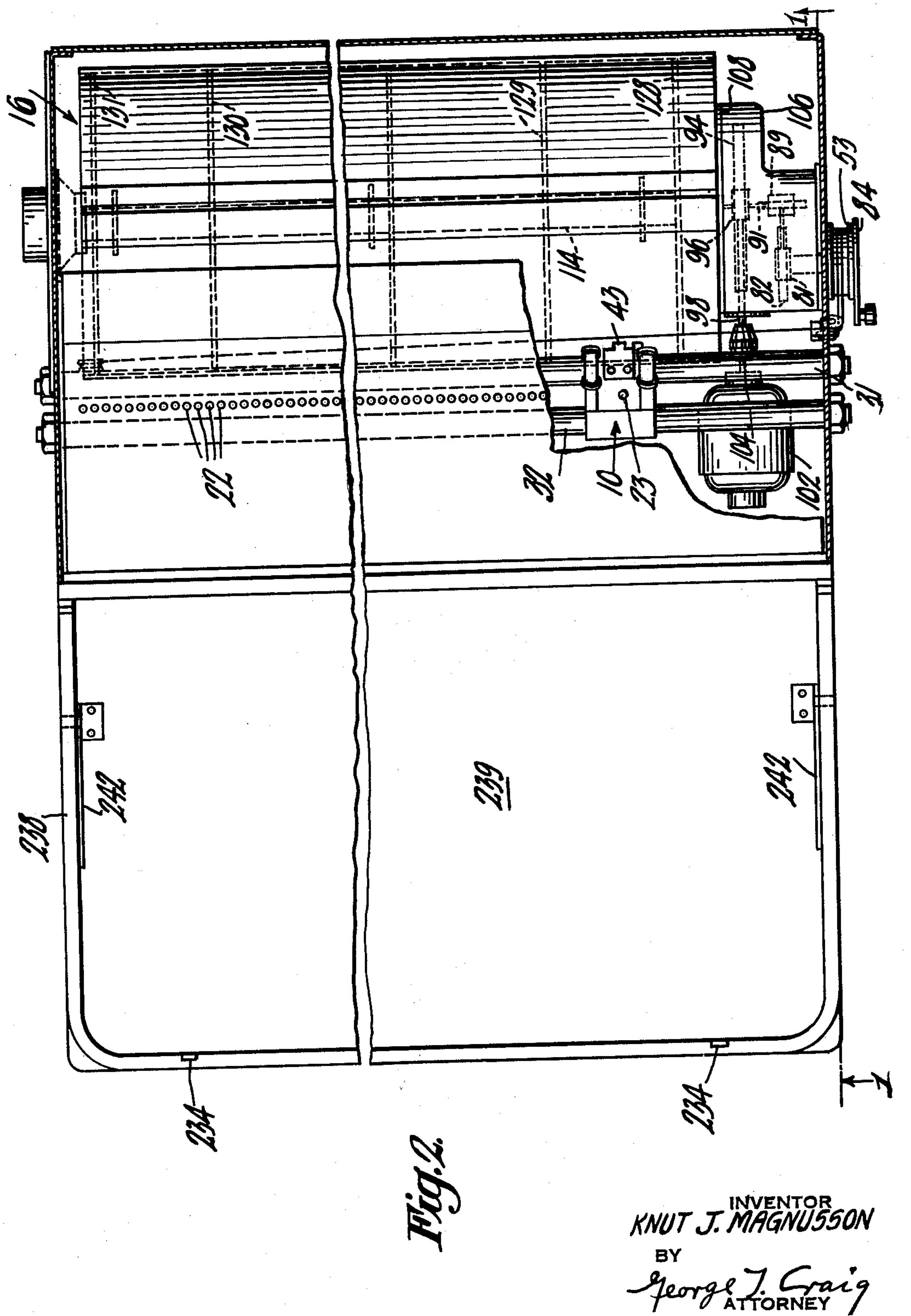
Fig. 2 is a plan view partially in section of the scanner of Fig. 1, the section being taken on line 2—2 of Fig. 1.
Figure 3:
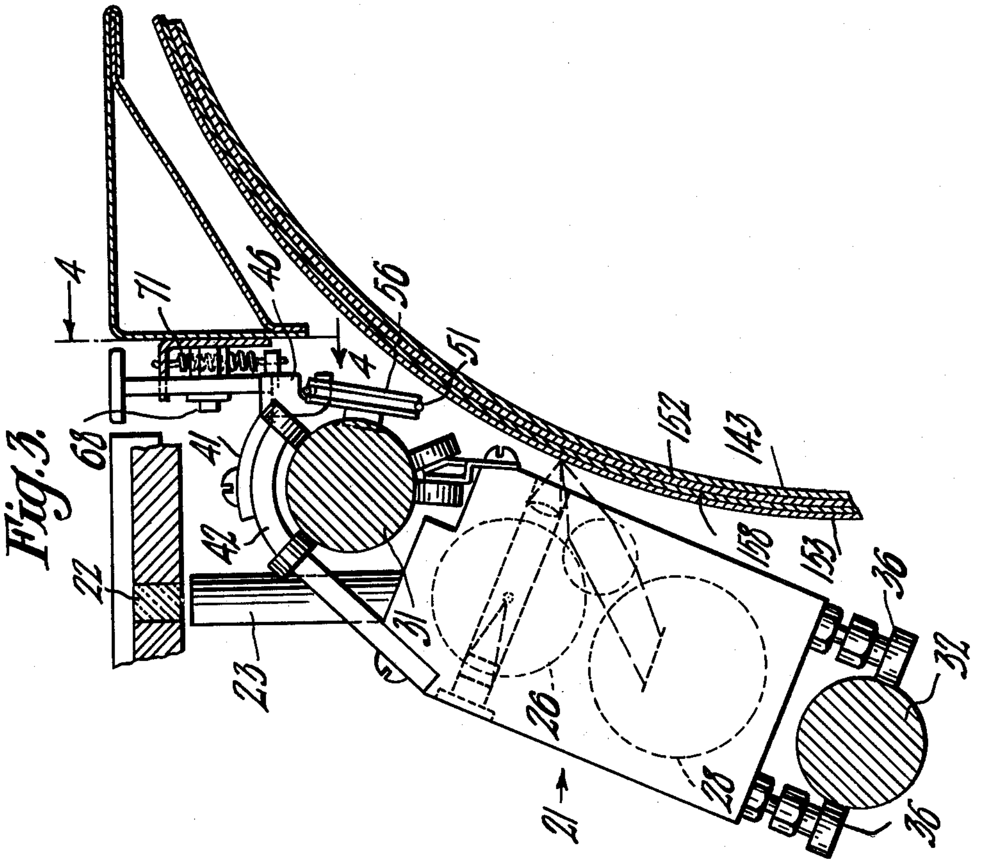
Fig. 3 is a fragmentary sectional view to an enlarged scale of a portion of the apparatus shown in Fig. 1.
Figure 4:
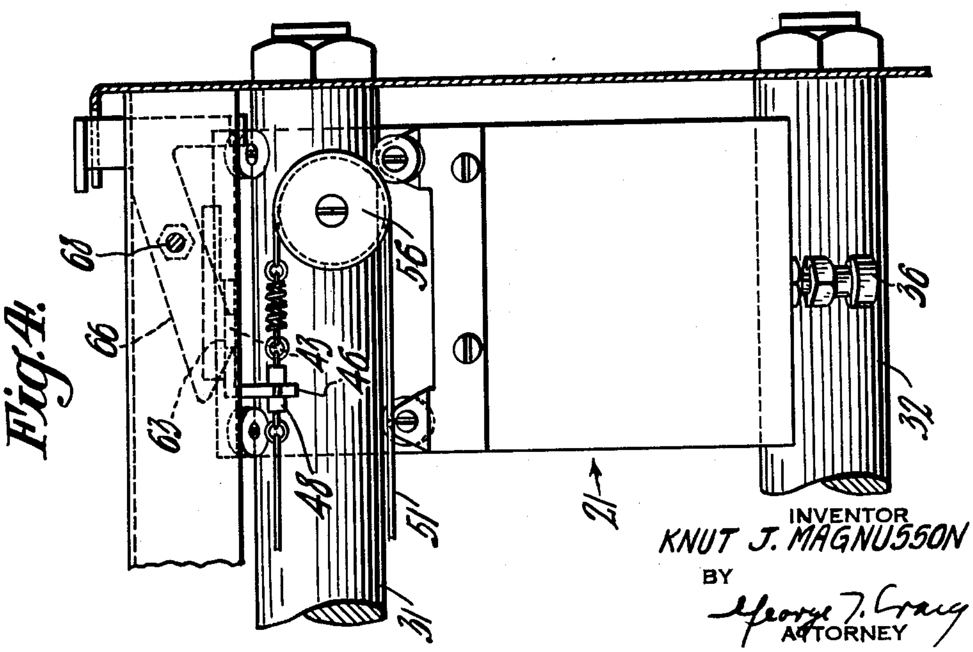
Fig. 4 is a view in elevation of the detail of construction illustrated by Fig. 3.

Referring to the drawings and as shown in Figs. 1 and 2, the entire scanner, designated generally by reference character 10, is mounted in a housing 12. The top 15 of the housing is formed as shown in Fig. 1 to provide a loading slot 14 to give loading access to the scanning drum designated in its entirety by reference character 16. The top of the housing also has a section 18 which serves to cover the optical scanning device 21. Travel of the scanning device is observable by the progressive illumination of a series of lucite lugs 22 from light transmitted upwardly by a lucite rod 23. The optical scanning device 21 as shown diagrammatically in Fig. 3 of the drawings includes a lamp 26 and a phototube 28. The lucite rod 23 receives light directly from the lamp 26.

The scanning device 21 is supported on rails 31 and 32 by rollers 36. A member 41 is mounted on the top bracket 42 of the scanning device 21. This member 41 is provided with a latch tongue 43 and a depending slotted arm 46 which receives a lug 48 on a drive cable 51 for the optical scanning device 21. The drive cable passes around a driving drum 53 and an idler pulley 56. Guide pulleys 58 and 59, suitably mounted on a stationary part of the casing 12 determine the course of the cable 51 along the strand which imparts movement to the optical scanning device 21.

The forked end 63 of a pivoted latch member 66 engages the tongue 43 when the scanning device 21 is at the initial end of its path of travel. The pivot point for the latch member 66 is indicated at 68 and the member is biased to latch in position by a spring 71. Pressure on a button member 74 releases the optical scanning device 21 so that it commences to scan.

The previously mentioned drum 53 is driven through a friction clutch 78 from a worm and worm gear combination 81 and 82. A crank handle 84 provides for manually moving the optical scanning device 21. The shaft 86 carrying the worm 81 is driven by a worm and worm wheel combination 89 and 91. The worm is mounted on a shaft 93 to which is secured a worm wheel 94. This worm wheel 94 is driven by a worm 96 on a motor shaft 98. The mechanism connected to and driven by the shaft 93 will be later described.

The previously mentioned shaft 98 is driven by a motor 102 through a flexible coupling 104. The motor 102 may be of any type known in the art and suitable for driving a facsimile scanner. The shafts 86, 93 and 98 have suitable bearings in a housing 106 which may be cast from suitable material, such as aluminum. A cover plate 108 is provided for the housing, which serves to support one bearing for the shaft 93.

The shaft 93 has a pilot recess 110 which receives the reduced end 111 of the drum shaft 114 for the drum 16. The other end of the drum shaft 114 is supported by a bearing 116 carried by the end wall 118 of the housing 12. As will appear, the shafts 93 and 114 rotate together during scanning. During unloading, the drum 16 and the shaft 114 both turn with respect to the shaft 93 and in the direction opposite to which they rotate during scanning. During loading, that is when the curtains 152 and 153 are rolled onto the drum, the shaft 114 and drum 16 turn in scanning direction under the influence of the springs 171 and 172. The shaft 114 is provided with a phasing commutator 121. A conductive segment 122 connected to the shaft 114 by a jumper 124 cooperates with a brush 126.

The drum 16 comprises axially circular discs of suitable material, such as duraluminum. There is a total of nine discs in the illustrative example, four of which, 128, 129, 130, and 131 are shown in Fig. 7. These discs are rotably journaled on the shaft 114 by center bearing members 134. At one point on the periphery the discs are connected by a channel shaped member 138, as shown in section in Fig. 6. The center portion of Fig. 7 shows a section axially of the drum through the channel 138. An aluminum sheet 143 is anchored along one edge of the channel and then wrapped around the discs and pulled taut by means of jackscrews along the other edge of the channel. The jackscrew structure comprises levers 146. These levers are integral with or effectively jointed to an elongated bar 145 which runs for the full length of the drum. One lever is shown on Fig. 6 and the other levers are similar. The top part of the lever is sectioned since it is the elongated bar. The lever seats against a fulcrum rod 148 adjacent one end and the sheet 143 is hooked into a groove in the elongated bar 145. A screw 151 serves to swing the lever and tighten the sheet 143 to form a drum skin. Two plastic sheets or curtains 152 and 153 are anchored to the bar end 145 of the levers 146. An angle piece 155 covers the ends of the sheets 152 and 153 and clamps these sheets to the bar 145. Reference character 158 indicates a piece of subject copy between the sheets 152 and 153.

The free end of the top sheet 153 ends in a tubular metal bar 161 which acts as a handle when unrolling the curtain 153. The bar 161 also acts as an anchor for the curtain stretching devices in the form of levers. Five levers are present in the illustrative example. Four of these appear on Fig. 7 and are designated 163, 164, 165 and 166. The lever 163 is pinned solidly to the shaft, while the other four levers are connected to the shaft with a slight angular play. This permits all levers to take an equal share of the load and yet stay operatively in line when released from the curtain.

The levers are drawn to the curtain locking position shown in Fig. 6 for the lever 163 by ten springs. Springs 171 and 172 are shown on Fig. 6. Spring 171 appears on Fig. 7. Springs 171 and 172 are anchored to the disc 128 and to a gear 176. The hub 179 of this gear is pinned to the shaft 114 and this hub carries the lever 163. Pairs of springs are provided for the other levers. One spring 178 for each lever appears on Fig. 7.

The gear 176 meshes with a pinion 181 pinned on a stub shaft 183 which is journaled in the disc 128. The stub shaft also carries a gear 186 which meshes with a gear 188. The gear 188 is secured to the hub 191 of a cam member 192. The hub 192 is journaled for rotation on the enlarged end of the shaft 93. A driven clutch plate 194 of a friction clutch is also secured to the hub 191. The driving portion 198 of the friction clutch is secured to the shaft 93.

Referring to Fig. 6, the previously mentioned cam member 192 is shown in greater detail and includes a cam slot 201 having the shape shown in outline on Fig. 6. The cam member 192 also has a spiral shaped periphery 204. The end of the slot and the end of the spiral terminate in a toe 206. A bell crank 208 is pivoted on a rod 210 which is secured to the cover plate 108. A tension spring 212 is also anchored to the cover plate 108. The bell crank 208 is provided with a toe 216 which in the position of parts in Fig. 6 engages the toe 206 of the cam member 192. This occurs when the channel member 138 is within the loading slot 14 of the housing 12.

A bell crank 218 is pivoted on a post 219 secured to the drum disc 128. One end of this bell crank is provided with a roller 223 which enters the cam slot 201 during scanning to provide a locking engagement. A spring 226 is anchored to the end of the bell crank and to the disc 128.

In the position of the parts shown in Fig. 6, the levers 163 to 166 and others (not shown) are about to release the bar 161. During scanning, the spring 226 and the bell crank 218 with the cam roller 223 try to rotate the drum counter clockwise as viewed in Fig. 6 with respect to the cam member 192 and the gear 188. Back lash in the gear train comprising the gears 176, 181, 186, and 188 is thus taken up, and tightening force on the levers 163 to 166 is increased. To unload the subject copy 158, clockwise rotation of the drum 16 brings the tip 206 of the cam member 192 against the toe 216 of the bell crank 208 and the gear 188 stops. Continued drum rotation starts differential action to the gear train through the levers 163 to 166. The levers lag behind the drum to release the bar 161 and the plastic sheet or curtain 163. The bar may then be lifted out and drawn to the left as viewed in Fig. 1 so that it can be engaged with hooks 234 on the end of a generally U-shaped pivoted frame 238. The inner sheet or curtain 152 is also drawn along with the bar 161 and the curtain 153 so that it lays against a table member 239. This table member is hinged to the housing 12 and forms the top or lid when it is closed. The frame 238 may be tilted upwardly where it is held by a bar 242 so that the two curtains are separated. The scanned copy sheet 158 is then readily withdrawn from between the two curtains and other subject matter may be inserted.

While the curtains 152 and 153 are being unrolled and drawn to the left as viewed in Fig. 1, the drum 16 rotates approximately one revolution. The cam roller 223 hitting the bell crank end 216 prevents the curtains from being pulled out too far. The springs 171 and 172 furnish the power to return the drum when tension on the curtains 153 is relaxed. After the curtain is returned inwardly toward the drum, it is laid in place and is automatically picked up by the stretching levers 163 to 166.

What is claimed is:

1. In a facsimile scanner, a copy holding drum, a pair of superimposed flexible curtains for receiving subject copy between them, at least one of said curtains being transparent, each curtain having one end connected to said drum, securing means at the other end of one of said curtains, and mating means on said drum to engage said securing means.

2. In a facsimile scanner, a copy holding drum, a pair of superimposed flexible curtains for receiving subject copy between them, at least one of said curtains being transparent, each curtain having one end connected to said drum substantially flush with the peripheral surface of the drum, securing means at the other end of one of said curtains, and means on said drum and beneath the peripheral surface thereof to engage said securing means.

3. In a facsimile scanner, a copy holding drum, a pair of superimposed flexible curtains for receiving subject copy between them, each curtain having one end connected to said drum, securing means at the other end of one of said curtains, and automatically releasable means on said drum to engage said securing means.

4. In a facsimile scanner, a copy holding drum, a pair of superimposed flexible curtains for receiving subject copy between them, the outer curtain being transparent, each curtain having one end connected to said drum, securing means at the other end of said outer curtain, and means on said drum to engage said securing means.

5. In a facsimile scanner, a copy holding drum, a pair of superimposed flexible sheets for holding subject copy between them, means for securing said sheets at one end to said drum, the free end of one of said sheets having a bar secured thereto, a shaft for said drum and on which said drum is journaled, a plurality of levers secured to said shaft, each lever having an end for engaging said bar, a drive shaft in alignment with said drum shaft, a gear secured to said drive shaft, a gear secured to said drum shaft to which said levers are secured, a pair of axially aligned gears secured to a third shaft, said third shaft being rotatable with said drum, said four gears meshing to provide a planetary gear system, said gear system causing said levers and said drum to rotate through different angular distances when said drum is rotated against the direction of scanning to release said levers from said bar through said planetary gearing.

6. In a facsimile scanner, a copy holding drum, a pair of superimposed flexible sheets for holding subject copy between them, means for securing said sheets at one end to said drum, the free end of one of said sheets having a bar secured thereto, a shaft for said drum and on which said drum is journaled, a plurality of levers secured to said shaft, each lever having an end for engaging said bar, a drive shaft in alignment with said drum shaft, a gear and a cam secured to said drive shaft, a gear secured to said drum shaft to which said levers are secured, a pair of axially aligned gears secured to a third shaft, said third shaft being rotatable with said drum, said four gears meshing to provide a planetary gear system, and a bell crank having a relatively fixed pivot, said cam having a stop projection thereon, said bell crank having a toe for engaging said stop projection when said drum is rotated against the direction of scanning to release said levers from said bar through said planetary gearing.

7. In a facsimile scanner, a copy holding drum, a pair of superimposed flexible sheets for holding subject copy between them, means for securing said sheets at one end to said drum, the free end of one of said sheets having a bar secured thereto, a shaft for said drum and on which said drum is journaled, a plurality of levers secured to said shaft, each lever having an end for engaging said bar, a drive shaft in alignment with said drum shaft, a gear and a cam secured to said drive shaft, said cam having a cam slot and a substantially spiral periphery, a gear secured to said drum shaft to which said levers are secured, a pair of axially aligned gears secured to a third shaft, said third shaft being rotatable with said drum, said four gears meshing to provide a planetary gear system, a locking bell crank pivoted on said drum structure and being rotatable therewith, said bell crank having a roller at its end for engaging said cam slot in said cam, and a second bell crank having a relatively fixed pivot, said cam having a stop projection thereon, said second bell crank having a toe for engaging said stop projection when said drum is rotated against the direction of scanning to release said levers from said bar through said planetary gearing.

References Cited in the file of this patent

UNITED STATES PATENTS

| | | |
|---|---|---|
| 1,723,228 | Burnham | Aug. 6, 1929 |
| 1,747,963 | Wichmann | Feb. 18, 1930 |
| 1,787,187 | Brueshaber | Dec. 30, 1930 |
| 1,984,115 | Cooper | Dec. 11, 1934 |
| 2,049,917 | Mallina | Aug. 4, 1936 |
| 2,123,997 | Jirousek | July 19, 1938 |
| 2,145,072 | Cooley | Jan. 24, 1939 |
| 2,182,115 | Carlson | Dec. 5, 1939 |
| 2,356,999 | Hogan | Aug. 29, 1944 |
| 2,381,461 | Morse | Aug. 7, 1945 |
| 2,409,536 | Braunworth | Oct. 15, 1946 |
| 2,514,974 | Schauer | July 11, 1950 |
| 2,553,856 | Janke | May 22, 1951 |
| 2,583,889 | Schoonenberg | Jan. 29, 1952 |